Nov. 28, 1939.　　K. E. KUNZE ET AL　　2,181,815
AIRCRAFT INSTRUMENT
Filed May 6, 1936

Karolus E. Kunze
Theodore L. Soo-Hoo.
INVENTORS

Nov. 28, 1939.   K. E. KUNZE ET AL   2,181,815
AIRCRAFT INSTRUMENT
Filed May 6, 1936   2 Sheets-Sheet 2

INVENTORS

Patented Nov. 28, 1939

2,181,815

UNITED STATES PATENT OFFICE 2,181,815

AIRCRAFT INSTRUMENT

Karolus E. Kunze, Jamaica, N. Y., and Theodore
L. Soo-Hoo, Quincy, Mass.

Application May 6, 1936, Serial No. 78,138

5 Claims. (Cl. 88—1)

The invention relates to an aircraft instrument in which a neutrally balanced directive magnet system and a rotatable course indicator are simultaneously observed through a periscopic optical system. The objects of the invention are: first: to provide an aircraft magnetic compass suitable for indicating both the magnetic heading and deviations therefrom, i. e., a compass free from acceleration errors; and, second: to provide a magnetic instrument suitable for indicating the attitude changes of an aircraft.

The present aircraft magnetic compasses, being affected by accelerations and, therefore, being unreliable except in straight flight, are, alone, of little value during instrumental flight. On the other hand, gyroscopic instruments suitable for use on aircraft and having inherent directional qualities are not yet commercially available. Hence, for conditions of instrumental flight the course is held, in the present state of the art, by the combined readings of a magnetic compass and one or more gyroscopic instruments. Commercially, this requirement of multiple instruments for maintaining directed rectilinear instrumental flight imposes a serious handicap upon smaller aircraft which do not warrant the financial outlay necessary.

The aircraft instrument described herein accomplishes the combined purposes of the magnetic compass and directional gyro, as well as acting in the capacity of a relative bank and pitch indicator, thereby making available in compact form the required instruments for maintenance of directed rectilinear flight. It is particularly adaptable to smaller aircraft and also will serve as an auxiliary instrument in larger installations.

Figure 1:
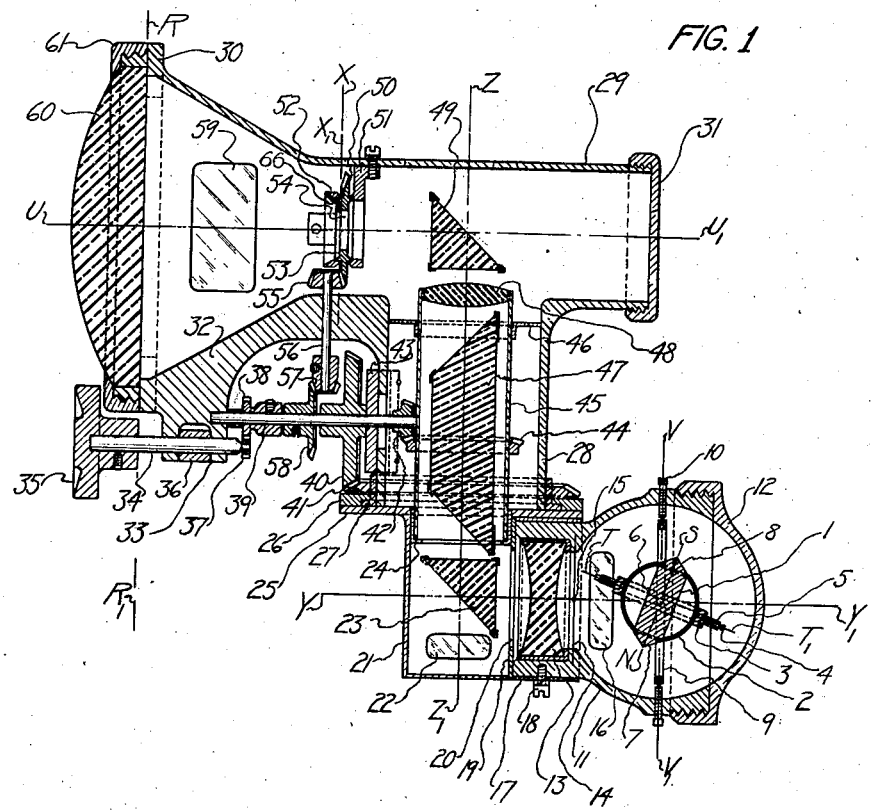
Figure 2:
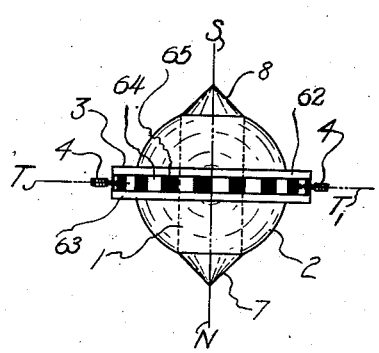
Figure 3:
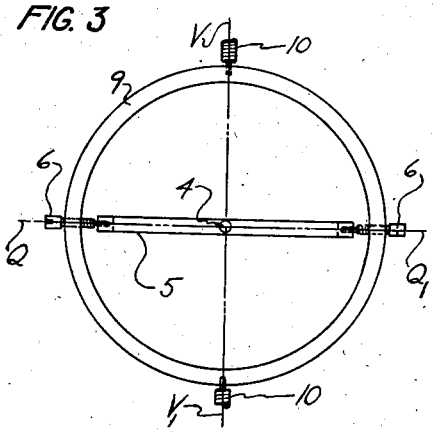
Figure 5:
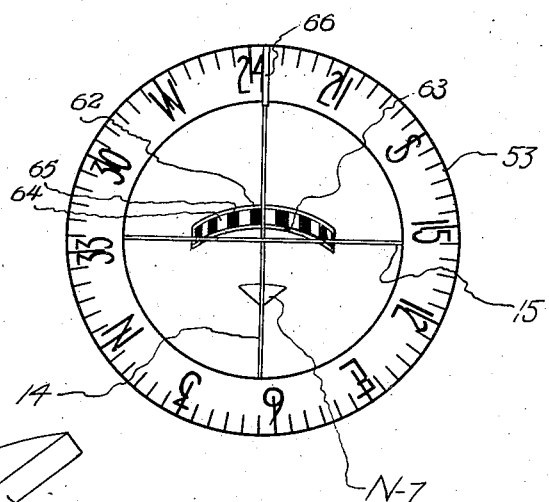
Figure 4:
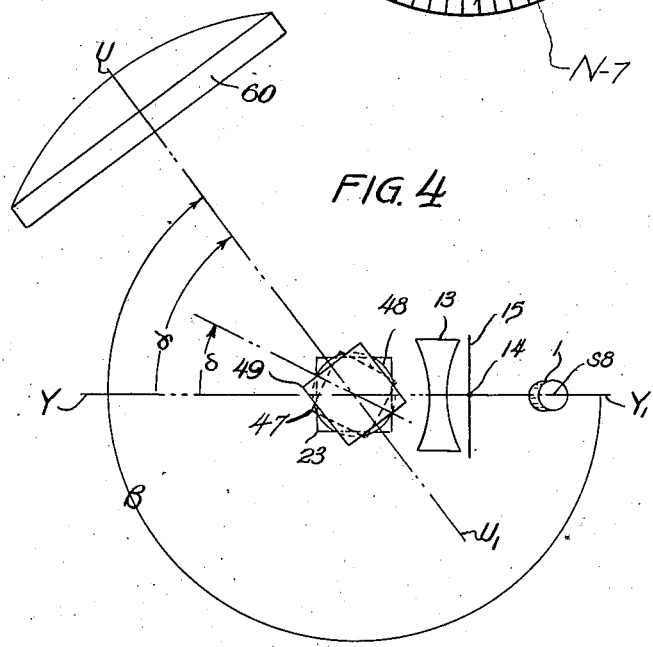

A specific form of the invention is illustrated by the accompanying drawings in which Fig. 1 is a full size sectional elevation of the complete instrument, the section being taken on the vertical fore-and-aft plane through the center of the instrument when the latter is set for a due south heading; Fig. 2 is an enlarged view of the directive magnet and its holder, showing the characteristic markings; Fig. 3 is an enlarged view of the gimbal rings of the directive element assembly; Fig. 4 is a plan view of the optical and geometric elements of the system; and Fig. 5 is an approximately full-size view showing the combined images, as visible to the observer, for steady, normal-attitude, rectilinear flight on a heading of 235°.

Referring to Fig. 1, the directional unit is seen to be assembled in a two-piece container, the main portion being labelled 11, while the after portion—in effect, a screw cap—is marked 12. A lens 13 is cemented into a circular opening in the front of 11, as shown. A pair of side windows, one of which is shown at 16, admit light from natural or artificial sources. This assembled container will hereinafter be referred to as the "compass case". It is filled with a damping liquid, introduced through a normal filler tube, and fitted with an ordinary expansion chamber. For the sake of clarity the filler tube, plug, and expansion chamber are omitted from the drawings and the presence of the damping liquid is not indicated.

The central magnetic element is shown clearly in Fig. 2, which is a front view with the magnet in a vertical position. Here, the directional magnet 1 is seen to be a relatively short and thick bar with conical tips 7 (North-seeking pole) and 8 (South-seeking pole). This magnet is symmetrically mounted in a small hollow sphere 2, of suitable material, the conical pole pieces being left in exterior positions as shown. Surrounding the sphere 2, and secured to it, is a relatively broad band 3, of suitable material. This entire combination is symmetrically built. The band 3 is painted in any characteristic manner, such as that shown where the upper and lower rims are painted white, as indicated at 62 and 63, while the central portion is painted with alternate black and white checks, 65 and 64. This marking effectively identifies the equatorial regions of the field of magnet 1. The polar regions of this field are also identified by any characteristic markings, such as painting the cone tips 7 and 8 white. In the particular instrument being considered, the North-seeking pole tip 7, only, is painted white. Parts other than those marked as described are painted black, or in a manner which most efficiently obliterates them from view. The assembly consisting of the magnet 1, sphere 2, and band 3, will hereinafter be called the "director element".

The director element is mounted within the pair of gimbal rings shown in Fig. 3. The pivots 4, 4, are screwed through diametral positions in ring 5 and carry the director element, by means of jewel bearings or otherwise. The axis determined by the pivots 4, 4 is labelled T—T₁ and intersects the magnetic axis of magnet 1 at right angles, and at the mass center of the director element. The outer gimbal ring 9 carries the inner ring 5, by means of the pivots 6, 6, the axis Q—Q₁ determined by the latter intersecting T—T₁ at the resultant center of mass of ring 5 and pivots 4, 4. The outer ring 9 is carried by vertical pivots 10, 10, which determine an axis V—V₁. The axis V—V₁ intersects Q—Q₁ at the resultant center of mass of ring 9 and pivots 6, 6.

Referring again to Fig. 1, it is seen that the pivots 10, 10 are mounted in the top and bottom of the compass case. Thus the compass case holds the central directive magnet, 1, in a manner allowing the latter three degrees of angular freedom. Since the common point of intersection of the three axes of motion of the directive magnet system is coincident with the point at which the resultant mass centers of the system are located, the magnet is free to take up the position of the resultant external field at the location of the instrument and forces acting upon the system, due to straight-flight accelerations or turns, cause negligibly small deflecting torques.

Thus the director element maintains a nearly uniform angular position in the magnetic field, irrespective of the velocity conditions of the aircraft. For this reason it is a reliable indicator of direction regardless of whether or not the flight is rectilinear.

In other words, the magnet 1, Fig. 1 and Fig. 2, aligns itself with the magnetic field and retains this alignment practically undisturbed by deflecting forces, at all times and regardless of the position of the compass case. Therefore, it is a continuous indicator of the direction of the magnetic field at the instrument.

In order to determine the azimuth, the compass case is equipped with a vertical cross wire 14, Fig. 1, located in that vertical center-line plane of the compass case which passes through the center of lens 13. When this cross wire is aligned with the magnetic axis of the director element, the compass case is in an angular position, relative to the field, which will hereinafter be referred to as the "oriented position". That is, in the oriented position the plane determined by the center of the compass case and the vertical cross wire 14 is parallel to a median plane of the external magnetic field existing at the position of the compass case. Since the external field in the case of an aircrft instrument is the earth's magnetic field, the oriented position of the compass case, when the instrument is in use, is that position in which the plane determined by the cross wire 14 and the center of the compass case is in the magnetic meridian. An horizontal line Y—Y₁, Fig. 1, intersecting both the vertical cross wire and the center of the compass case and passing through the center of the lens 13 is, thus, a magnetic North-South line when the compass case is oriented under conditions of use.

A cross wire 15 is placed in the compass case in a position mutually perpendicular to the cross wire 14 and the line Y—Y₁. The cross wire 15 is, therefore, normally horizontal.

The compass case is placed in the oriented position as follows:

The vertical cross wire 14 is aligned with one conical pole tip of the director element as, in this case, the tip 7, Fig. 1 and Fig. 2. Simultaneously, the horizontal cross wire 15 is aligned with a diameter of the circular band 3, Fig. 1 and Fig. 2. Assuming Y—Y₁ to be horizontal and depending upon the value of the dip and the azimuth position of Y—Y₁, the circular markings on band 3 will show, when viewed through the lens 13, as ellipses of varying eccentricities, appearing as straight lines when the dip is 90° or the magnetic azimuth of Y—Y₁ is 90°, and as circles when the dip and the azimuth of Y—Y₁ are both zero. Hence, when the horizontal cross wire 15 appears to coincide with a major diameter of the projection of band 3, with the latter exhibiting its minimum eccentricity, the line Y—Y₁ is in the meridian and the compass case is oriented. The vertical cross wire 14 then appears to coincide with a minor diameter of the band 3.

It is to be noted here that there are other ways of using the same, or similar, characteristic director element markings for orientation such as, for instance, aligning both conical tips 7 and 8 with the vertical cross wire 14; or turning the compass case until the band 3 appears as a straight line, thus placing the line Y—Y₁ east and west; or by viewing the director element from above or below and using methods similar to those just described; but herein only one method will be considered—namely, that wherein the horizontal cross wire 15 appears coincident with the major diameter of the band 3 and, at the same time, the vertical cross wire 14 is lined up with the North-seeking conical pole tip 7 and appears as the minor diameter of band 3. Also, of two possibilities, the arbitrary position chosen for this orientation is that position in which the lens 13 is on the north side of the director element. That is, the observer is looking toward magnetic South when the compass case is oriented. Thus, when the compass case is oriented, that half of the band 3 which is visible lies above the horizontal cross wire 15 while the pole tip 7 lies below this cross wire, in north magnetic latitudes.

This condition is illustrated in Fig. 5 where the compass case is oriented in a field having a north dip of about 70°, the director element being due south, magnetically, from the observer.

Any deviation of the compass case from its position of orientation shows as a relative motion between band 3 and pole tip 7, and the cross wires. An azimuth deflection shows as a motion of pole tip 7 away from cross wire 14, and, simultaneously, as a lateral bodily motion of the visible half of band 3 away from cross wire 14.

For deviations of the compass case from its position of orientation, other than azimuth deviations, similar relative displacements occur between the director element and the cross wires. For instance, an angular displacement of the compass case about any horizontal line parallel to the horizontal cross wire 15, shows as a bodily vertical motion of the band 3 and pole tip 7, relative to the horizontal cross wire. Again, an angular motion of the compass case about any line parallel to Y—Y₁ shows as a lateral displacement of the pole tip 7 relative to the vertical cross wire 14, and as a rotation of the principal axes of the band 3 relative to the cross wires, i. e., as a motion of the visible half of band 3 which destroys its symmetrical position "on" the cross wires.

Since this method of azimuth determination requires the effective point of observation to be continually on the North side of the director element, while the observer's actual position may have any bearing relative to the director element, a periscopic observation system, such as that shown in Fig. 1, is used. The particular type illustrated herein consists of a negative objective, lens; reflecting prisms; an inverting prism; and a two-lens ocular, as shown.

In Fig. 1 it is seen that the compass case is secured in a ring holder 17 by cap screws such as 18. This ring holder 17 is rigidly attached to a partition 19, which has an aperture 20 opening in front of the lens 13. The partition 19 also forms one wall of a compartment 21, the latter being open at the top and fitted with a side window 22 for illumination by natural or artificial light. The upper edge of the compartment 21 is secured to the bottom of a flange ring 25. A second flange ring 26, having an annular step turned in it as shown, is secured to the ring 25 by fastenings not shown.

The main case of the instrument, to be hereinafter referred to as the "instrument case", consists of a casting comprising, essentially, an upper horizontal tube 29 and a vertical tube 28. The forward portion of the horizontal tube is flared as shown and ends in a flange, 30, which is drilled for bolting to the instrument panel, the contact plane between flange and panel being designated $R$—$R_1$. The instrument case is thus held in a fixed position in the aircraft.

Secured to the outer circumference of the lower rim of the vertical tube 28 is a collar 27, formed with an integral horizontal flange ring as shown. The latter acts as a hanging bearing for the ring 26 and, therefore, supports the compartment 21 and the compass case in a manner which allows them freedom of rotation about the vertical axis $Z$—$Z_1$ of the tube 28.

For the purpose of effecting these rotations a knob 35 is placed in a convenient position. This knob is clamped by a set screw on the end of a spindle 34, the latter turning in holes drilled through lugs 33. These lugs are lower extensions of a fin 32, cast integrally with the instrument case as shown. A collar 36, on spindle 34 and secured to the latter by a set screw, maintains the correct axial position of the spindle. A small gear 37, secured to the end of spindle 34 by a set screw, engages a gear 38 which is mounted upon a second, parallel, spindle 39, and secured to the latter by a set screw as shown. The spindle 39 turns in bearings formed by holes in the fin 32 and a small plate 43, secured to the tube 28 by cap screws. The plate 43 also acts as a cover for an opening necessary for assembly. The axial spacing of spindle 39 is maintained by the end gear bosses, as is plainly indicated. The bevel gear 40, on spindle 39 and secured to the latter by a set screw, engages a bevel gear 41 which is secured to the flange ring 26. Rotation of the knob 35 thus causes rotation of the compass case about the axis $Z$—$Z_1$.

Hence, regardless of the heading of the aircraft, the compass case can be rotated by knob 35 until the lens 13 is due north of the director element and the compass case is in its oriented position.

A prism 23 is mounted in a permanent position in compartment 21, the position being that required to reflect the images formed by lens 13 up to a second prism 49, which is mounted in a permanent position in the horizontal tube 29 of the instrument case. The prism 49 then reflects the images forward, through the tube 29, to the observer. The observer, looking into the tube 29, is therefore able to rotate the compass case by turning knob 35 and continuouly view the director element as though looking through lens 13.

In order to prevent the rotation of the images of the director element and cross wires, characteristic of a reflector system of the type just described, the inverting prism 47 is inserted between the reflecting prisms 23 and 49. This inverting prism is mounted in a tube, 45, the axis of which coincides with $Z$—$Z_1$. The tube 45 is supported at the lower end by a step bearing 24, secured in the upper portion of compartment 21, and at the upper end by a bearing formed by the inside rim of a spider 46, the latter being rigidly mounted in the tube 28. The inverting prism tube and, therefore, the prism 47, is thus free to rotate about $Z$—$Z_1$.

Consider the images of director element and cross wires, as seen in prism 49, in a certain position, with the compass case oriented and the instrument set for a south course, as shown in Fig. 1. Then the images will remain in the same position while the course changes through 360°, the compass case remaining oriented, if the inverting prism 47 is rotated about $Z$—$Z_1$, in the direction of the course change, by half the angular value of the course change at any instant. This, of course, is a well-known principle.

The rotation of the prism 47 at half the speed of relative rotation between instrument and compass cases, and in the correct direction, is accomplished by means of the gearing shown in Fig. 1. A bevel gear 44 is secured concentrically on the outside of tube 45 and meshes with a bevel gear 42 mounted securely on the end of spindle 39, as shown.

Thus a rotation of knob 35 not only turns the compass case about $Z$—$Z_1$, but simultaneously rotates the inverting prism 47 about $Z$—$Z_1$ in the same direction and at half the speed that the compass case is turned.

Because of this, the images of the director element and cross wires always appear in the same position, as seen in prism 49, when the compass case is in its oriented position, regardless of the heading of the aircraft.

The lens 13 is a diverging lens designed to form reduced virtual images of the director element and cross wires, in order to reduce the necessary size of the inverting prism 47 and the reflecting prisms 23 and 49 to commercially practicable sizes. The cross wires 14 and 15 are located in the position which results in the least possible distance between images of director element and cross wires, the purpose being to reduce parallax to a minimum.

A converging field lens 48 is mounted in the upper end of tube 45 for the purpose of forming a real image of director element and cross wires, at a definite position. The reflection from prism 49 and the characteristics of lens 48 place the real images close to the plane $X$—$X_1$, and nearly symmetrically disposed about the axis $U$—$U_1$ of the tube 29.

In summary, the negative objective lens 13 forms reduced virtual images of the director element and the cross wires. These images are reflected from prism 23, upward. The prism 47, rotating with the compass case but at half speed, causes a rotation of the images, the angle of image rotation being equal to the angle of rotation of compass case relative to the instrument case. The positive field lens 48 converges the light from prism 47 and, with the reflection from prism 49, forms a set of real images close to the plane $X$—$X_1$. The rotation of prism 49 relative to prism 47 re-rotates the image system, with the result that the real images at $X$—$X_1$ remain stationary as the course changes, the compass case remaining oriented. The quadruple inversion of the original upright virtual image system by the two reflecting prisms, the inverting prism, and the field lens, results in a real image at $X$—$X_1$ which is an upright but reduced representation of the director element and cross wires as seen through lens 13.

A bevel gear 50 is mounted in tube 29 for rotation about the axis U—U₁ of the latter, the forward face of 50 being in the image plane X—X₁. The gear 50 has a clear central opening 54, and is supported by integral collars for rotation in ring bearings 51 and 52, which are attached to the instrument case as shown in Fig. 1. A small bevel gear 55 engages 50 and drives the latter. The gear 55 is secured to the upper end of a vertical spindle 56. The spindle 56 rotates in a bearing formed by a vertical hole drilled through the fin 32 and, at the lower end, carries a bevel gear 57, secured to 56. The gear 57 is engaged by a bevel gear 58, which is mounted on, and secured to, spindle 39, as shown. Through this system of gearing, the bevel gear 50 is rotated about U—U₁ whenever the compass case is rotated about Z—Z₁, and at the same speed.

On that portion of the forward face of the gear 50 which is included between the chamfered integral forward collar and the clear opening 54, is marked a "course dial", labelled 53, i. e., the graduations of a compass card. In this case the east and west halves of the card are interchanged in order to accommodate the direction of the rotation. An index 66, corresponding to a lubber's line, is mounted in a stationary position upon the bearing 52 and adjacent to the top of the course dial. Since the gear 50 rotates in synchronism with the compass case, the course dial 53 registers, against the index 66, the angle between the line Y—Y₁ and the U—Z plane. Also, the course dial is set to read South when the entire instrument is in the condition shown in Fig. 1, i. e., with the line Y—Y₁ in the U—Z plane and with the compass case and the plane X—X₁ on opposite sides of Z—Z₁. Therefore, when the compass case is oriented the reading of course dial 53 against index 66 is the value of the heading of U—U₁ and; hence, of the heading of the aircraft since U—U₁ is made parallel to the longitudinal center line of the aircraft, during installation, with U₁ forward.

Windows, such as 59, Fig. 1, placed in the forward portion of tube 29 furnish natural or artificial illumination for the course dial 53.

The real images of the director element and cross wires being formed at X—X₁, i. e., in the plane of 53, it is possible to magnify the entire group of observable elements with an eye lens 60, Fig. 1, which is held in a seat in the flange 30 by a retaining ring 61, secrewed into position as shown. The opposite end of the tube 29 is closed by a screw cap 31.

Fig. 4 is a plan view of the geometric and optical elements of the instrument, with the compass case oriented and a course setting of approximately 235°. The line Y—Y₁ is coincident with the meridian since the compass case is in the oriented position. The line U—U₁ makes the angle $\beta$ with the South→North direction of the line Y—Y₁. The angle $\beta$ therefore represents the course. The angle $\gamma$ is the angle through which U—U₁ has been turned, about Z—Z₁, from its position in Fig. 1 where the course angle $\beta$ is 180°. The angle $\delta$, Fig. 4, is the angle through which the prism 47 has been turned, about Z—Z₁, from its position in Fig. 1. In Fig. 4 the angle $\gamma$ is equal to $2\delta$.

Fig. 5 illustrates the final grouping of the indicating elements, when seen as a magnified, virtual, group image formed by the lens 60. The view shows the condition of steady flight, with the instrument setting as shown in Fig. 4.

In Fig. 5, the course dial 53 indicates 235° against the index 66. (Note: The reference numbers here used for the optical images are the same as those used heretofore in the case of the actual elements.) The conical pole tip—here labelled N—7—is aligned on the vertical cross wire 14. The apparently semi-elliptical white bands 62 and 63 are spaced symmetrically relative to the cross wires, i. e., the horizontal and vertical cross wires are aligned with major and minor diameters of the semi-ellipses. The alternate black and white checks, 65 and 64, show no motion.

Deviations from these conditions for steady flight are characteristics of the motions causing them, as, for example, the following:

Turning of the aircraft is indicated by a motion of the pole tip N—7 away from the vertical cross wire, accompanied by movement of the black and white checks; a motion of bands 62 and 63 which destroys their symmetrical placement on the cross wires, and at the same time changes the eccentricity of the semi-ellipses.

For flying a particular heading, the knob 35, Fig. 1, is turned, thus rotating the course dial 53 under the index 66, Fig. 5, until the required course is indexed. During this process the indicating elements shown in Fig. 5 will be thrown out of position. The aircraft is then turned until the indicating elements resume a correct position, as in Fig. 5, at which time the aircraft will be on the new course.

In constructing this instrument many variations of the essential method, herein described, are possible. For instance, other types of characteristic markings of the director element may be used; the compass case may be oriented with Y—Y₁, Fig. 1, east and west instead of north and south; the lens 13 may be placed above or below the compass case; the number and sequence of optical elements may be altered; a remote setting-control may be used; etc. For this reason it is to be understood that we do not limit ourselves to the specific construction herein described, except that actually necessary to accomplish the results in view, namely, the production of a magnetic-mechanical instrument suitable for indicating the heading and turns of an aircraft, as well as attitude in roll and pitch.

It is well understood by us that some of the elements herein described are not new, individually, but we wish it understood that we believe their combination to result in a unique, new, and useful aircraft instrument.

What we claim as new and desire to secure by Letters Patent of the United States, is:

1. In an aircraft instrument, the combination of an instrument case; a compass case attached thereto for relative revolution about a vertical axis; a statically balanced directive magnet system within said compass case and having three degrees of angular freedom relative to said case; equatorial and polar markings on said magnet system; vertical and horizontal cross wires mounted in said compass case; a graduated, rotatable course dial mounted in said instrument case; optical means for enabling simultaneous observation of said dial, and said cross wires superposed over said markings, continuously, irrespective of the angular position of said compass case relative to the observer's position; and means for rotating said compass case and said course dial in synchronism, relative to said instrument case.

2. In an aircraft instrument, the combination of an instrument case; a statically balanced directive magnet system essentially as described herein; horizontal and vertical cross wires; a negative objective lens for producing a reduced, virtual, image of said cross wires superposed over said magnet system; a compass case attached revolubly to said instrument case and containing said directive magnet system, cross wires, and negative lens; a periscopic optical system carried by said instrument and compass cases and comprising said negative lens, a reflector for apparently altering the position of said virtual image, a positive field lens for producing a real image of the reflected virtual image, a reflector for apparently altering the position of said real image, and a positive eye lens for magnifying the reflected real image, whereby the real image may be viewed from a single position of observation during revolutions of said compass case relative to said instrument case; and optical-mechanical means cooperating with said periscopic optical system for maintaining said reflected real image continuously upright, said means comprising an inverting prism placed coaxially with the principal optical axis of said periscopic optical system and for revolutions about said axis, and gearing interconnecting said inverting prism, said instrument case, and said compass case whereby revolutions of the compass case relative to the instrument case are accompanied by revolutions of the inverting prism relative to the instrument case, the prism revolving at half the rotary speed of the compass case and in the direction which maintains the said real image upright.

3. In an instrument of the character described, the combination of a short directive magnet having conical pole pieces; a hollow spherical holder through which said magnet passes diametrically with said ends protruding; means for mounting said spherical holder with angular freedom about three mutually perpendicular axes intersecting at the center of said spherical holder; markings visually defining the polar and equatorial regions of said directive magnet and the equatorial region of said holder; a containing case for said directive magnet and said means for mounting said spherical holder; and a second case, attached to said containing case in a manner allowing relative revolutions between the two cases about a normally vertical axis.

4. In an instrument of the character described, the combination of an optical system comprising a negative objective lens, two right-angle reflectors, a positive field lens, a positive eye lens, and a rotatable inverting prism; with a rotatable compass case offset from, but revoluble about, the axis of rotation of said inverting prism, the said optical system forming a periscopic arrangement for continuously viewing, from a fixed position of observation relative to said eye lens, the interior of said compass case through said inverting prism; and gearing interconnecting said casing and prism to cause said inverting prism to revolve at half of the rotary speed of said compass case and in the same direction.

5. In an instrument of the character described, the combination of: a compass case; a directive element comprising a central directive magnet; a spherical float; means for fastening said magnet symmetrically within said float with the magnetic axis of said magnet and a diameter of said float coincident; means for mounting said float and magnet within an inner gimbal ring for rotation about a first axis passing through the center of the magnet and at right angles to the magnetic axis; means for mounting said inner gimbal ring within an outer gimbal ring for rotation about a second axis perpendicular to said first axis; means for mounting the said outer gimbal ring within said compass case for rotation about a third axis perpendicular to said second axis; markings defining the polar and equatorial regions of said central magnet; and a supporting case attached to said compass case by means allowing rotation of said compass case, relative to said supporting case, about an axis parallel to that vertical line which normally includes the center of motion of said central magnet.

KAROLUS E. KUNZE.
THEODORE L. SOO-HOO.